2,802,303
Patented Aug. 13, 1957

2,802,303
EROSION CONTROL

Lloyd E. Weeks, Union, Ohio, assignor to Monsanto Chemical Company, St. Louis, Mo., a corporation of Delaware No Drawing. Application June 4, 1953,
Serial No. 359,657

19 Claims. (Cl. 47—9)

This invention relates to new and useful procedures for minimizing water and wind erosion of surface soils, and for arresting presently occurring natural erosions. More specifically, the invention relates to a surface treatment of soils which, in addition to rendering the surface soil stable to erosion, does not interfere with the growth of crops on the said soils.

The need for an inexpensive and readily practicable method of preventing losses of agricultural soils through the action of wind and surface water has long been urgent. Soils of poor physical structure containing minute particles in unaggregated form are readily eroded by the displacement of said particles and their suspension in the atmosphere or in water contacting the soil. Soils of average structure in which the aggregated particles are unstable may have the aggregates broken down by the force of running water or by raindrop impact. Even good fertile soils, which are normally stable to erosion, may be seriously damaged when subjected to severe natural phenomenon, for example, floods and torrential rains. Once the covering vegetation is removed, entirely or in part, by erosive action, the damage through loss of soil is accelerated, and it becomes extremely difficult to recover control of the erosion.

It has now been found that soils may be made more resistant to erosive forces by a surface treatment with a mixture of a water-soluble cellulose derivative and a finely-divided expanding lattice clay. This mixture, after deposition on the soil forms a protective film which prevents the slaking and eroding effects of water. Soils so treated exhibit a marked improvement in resistance to wind and water erosion.

The expanding lattice clays are those which, when contacted with water, separate into individual crystals which are readily dispersed in the water and spread out to cover the surface of the normal soil with a complete and uniform clay film. When used in the presence of the said cellulose derivative, the clay film is stabilized by having the individual crystals tied into the structure by absorption of the cellulose derivative molecules at one or more sites on many different clay particles.

The clays intended to be included within the scope of the expression "expanding lattice clays" are the minerals known and used commercially under the name "bentonite." This generic expression includes various expanding lattice minerals, such as montmorillonite, hectorite, saponite, and nontronite, the crystals of which are flat plate-like structures capable of expanding substantially in the presence of water. The expansion property of clays which determines whether they are included within the scope of the expression "expanding lattice clays" is measured by X-ray diffraction, the useful clays being those in which the $c$-axis when saturated with water reaches a maximum greater than 25 angstroms.

Water-soluble cellulose derivatives are compounds of a structure like cellulose, except that they are chemically reacted to introduce hydrophilic groups, such as carboxy, carboxy salt, carboxy alkyl, hydroxyl and hydroxy alkyl. It is necessary to have sufficient of these substituents to render the normally insoluble cellulose at least partly soluble in water. When these substituents contain a hydrocarbon grouping, as in carboxy alkyl or hydroxy alkyl, the effect of the hydrophobic hydrocarbon grouping may offset the hydrophilic properties of the substituent. Thus the hydroxy alkyl and/or carboxy alkyl compounds with larger hydrocarbon portions in their substituents must necessarily possess a substantial number of carboxy, hydroxyl, or other hydrophilic substituents so as to develop water solubility. Suitable compounds are sodium carboxymethyl celluloses, made by chloroacetic acid action on cellulose, wherein up to three substituents may exist for each anhydrogluco, or glucose unit, which are commercially available. Other useful compounds can be made by ethylene oxide condensation on cellulose, for example, hydroxyethyl cellulose. Other compounds can be prepared by analogous reactions.

The method of preventing erosion by the use of the compositions described and claimed in this application may involve the use of mixtures of water-soluble cellulose derivatives and the expanding lattice clays, preferably in solid pulverulent form. When used in solid form the expanding lattice clays and water-soluble cellulose derivatives are mixed in suitable proportions, for example more than 2 percent and up to 100 percent of the cellulose derivative (based on the weight of the clay). Mixtures of optimum utility are those wherein the water-soluble cellulose derivative is present to the extent of from 5 to 20 percent of the clay.

The solid erosion control composition is applied to the surface of the soil subject to erosion by any of a wide variety of spreading apparatus used in the agricultural field, for example fertilizer spreaders, seed drills, and the like. It is generally desirable for the composition to be applied uniformly to the surface of the soil rather than to be mixed within the body of the surface soil. Although the application of the mixture of expanding lattice clay and water-soluble cellulose derivative is preferred, separate applications of each component may be used, for example the application of the clay to the surface soil and thereafter spreading the water-soluble cellulose derivative on top of the clay. Irrespective of how the application of water-soluble cellulose derivative and clay to the surface of the soil is made, it is generally desirable to wet the composition, either artificially or by natural occurrence of rainfall, to minimize losses through action of wind and to accelerate the reaction between the composition and the soil.

One method of using the soil erosion preventative composition involves the dispersing of the mixture of expanding lattice clay and water-soluble cellulose derivative in water and applying the slurry so prepared on the surface of the soil by any type of a sprinkling apparatus. This method of application may conveniently be effected by spraying with a stream of water from a tank truck or from any other water source and injecting the water-soluble cellulose derivative and expanding lattice clay into the stream of water close to the sprinkling nozzle. Obviously, the water-soluble cellulose derivative and expanding lattice clay may be injected into the stream of water at separate points or they may be pre-mixed and injected as a single composition. The water slurry application is sometimes advantageous because the thin slurry permits the penetration of the water-soluble cellulose derivative and clay to a slight extent throughout the entire surface and any apertures in the earth's surface such as cracks, seams, or perforations will be effectively filled with active ingredients. The aqueous slurry technique often permits a more uniform and more continuous application than is achieved by the solid powder distribution method.

The aqueous slurry technique may also be modified by mixing seed and fertilizer with the aqueous slurry. In this manner slopes to be planted with grass may be seeded, fertilized, and stabilized to erosion in a single operation. Generally, where grass is to be grown on the surface to be treated, it is desirable to use from 200 to 1000 pounds per acre of the water-soluble cellulose derivative—expanding lattice clay mixture. On steep slopes, for example road shoulders, or earth embankments, levees, and road cuts through high ridges, more of the composition, for example as much as 2000 pounds per acre may be required.

In the practice of this erosion method frequently difficulties may be encountered due to the cracking of the surface. This is caused by the excessive drying through solar evaporative influences. If the cracking is accompanied by contraction, the surface layer may curl and expose the original soil surface resulting in loss of part of the beneficial effect. This cracking and curling may be minimized by using, for example, sodium carboxymethyl cellulose-bentonite mixtures in the presence of a small amount of fibrous material, such as paper pulp, asbestos, newspaper strips, sawdust, and the like. Preferred methods of using this modification of the invention may involve the addition of the fiber to the pulverulent mixture or it may involve the addition to the slurry of the sodium carboxymethyl cellulose-bentonite mixture in water.

Under certain conditions the water-soluble cellulose derivative-clay compositions may be subject to partial destruction by bacteria residing in the soil. In these circumstances, small portions of bactericides will be found to lengthen the period of effectiveness of the compositions.

The invention will be further described with respect to specific experiments. Soil beds were prepared from an erosive silt by screening the soil to remove stones and other foreign matter, and depositing the soil in a container which was disposed at a slope of 15°. The surface of the test beds were treated with mixtures of sodium carboxymethylcellulose and clays in the form of a slurry and applying the dispersion uniformly over the soil surface. The controls with sodium carboxymethylcellulose or clay were surface treated with the same quantity of water. The soil beds were then subjected to artificial rainfall which was standardized by establishing a large number of uniformly spaced drop sources and rotating the soil beds.

*Example 1*

Five soil beds were each treated with a 2.5 percent slurry of one part by weight of sodium carboxymethylcellulose and nine parts by weight of bentonite. The application of slurry was made in amount equal to 5000 gallons per acre. The control soil bed was treated without addition of either the sodium carboxymethylcellulose or clay. All of the soil beds were subjected to artificial rainfall at the rate of 2.3 inches per hour for a period of 31 minutes. The following table shows the loss of soil in tons per acre observed in these experiments.

| Sodium Carboxymethyl Cellulose,[1] lbs./acre | Bentonite, lbs./acre | Soil Loss, tons/acre |
|---|---|---|
| 100 (1.2; high) | 900 | 2.5 |
| 100 (1.2; medium) | 900 | 2.7 |
| 100 (0.7; high) | 900 | 1.2 |
| 100 (0.7; medium) | 900 | 4.6 |
| 100 (0.7; low) | 900 | 6.6 |
| Control | | 13.8 |

[1] The products employed in these tests were those sold by Hercules Powder Company under the trademark "CMC." The numbers 1.2 and 0.7 refer to the number of sodium carboxy groups substituted for anhydro gluco groups. High, medium and low designate the viscosity.

*Example 2*

The procedure of the preceding example was employed in experiments which were conducted to show the effect of addition of fibrous materials to a mixture of high viscosity sodium carboxymethylcellulose which has 0.7 sodium carboxy groups substituted for anhydro gluco groups and bentonite. These tests were conducted using artificial rainfall at the rate of 1.71 inches per hour for a 30-minute period. Shredded newspaper was used to supply the fibrous material. All other conditions were the same as employed before.

| Sodium Carboxymethyl Cellulose, lbs./acre | Bentonite, lbs./acre | Fibrous Material, lbs./acre | Soil Loss, tons/acre |
|---|---|---|---|
| 100 | 900 | -------- | 1.9 |
| 100 | 900 | 100 | 1.0 |
| 100 | 400 | 100 | 0.2 |
| 100 | 400 | 50 | 0.1 |
| 50 | 900 | 100 | 0.4 |
| 50 | 400 | 100 | 0.3 |
| Control | -------- | -------- | 5.8 |

These examples show that expanding lattice clays, such as montmorillonite which is commercially known as bentonite, may be used as an erosion resistant surface coating when modified in the manner described. The montmorillonite by itself will form surface coatings, but they are not erosion resistant, because in the presence of water the clay particles assume an expanded state and flow readily to uncover the surface and expose it to the erosive action of water. The applicant has found that the use of cellulose which has been made water-soluble by the chemical introduction of hydrophilic substituents, with the expanding lattice clays, produce a much more resistant surface, because the hydrophilic groups of the modified cellulose become chemically or physically bonded to the particles of expanding lattice clays binding them together to form a continuous sheet-like structure which bonding prevents the flowing of the particles in the event of heavy rainfall. The nature of the bond has not been definite ascertained, but it is believed to be either a pseudo-chemical adsorption or a physical reaction in the nature of hydrogen bonding. Under normal conditions, this combination has been found to form a surface coating which will prevent erosion by rainfall or flow of surface water.

What is claimed is:

1. A method of minimizing erosion of a soil surface which comprises coating the soil surface with an aqueous slurry of a mixture of an expanding lattice clay and from 2 to 100 percent (based on said clay) of cellulose made water-soluble by the chemical introduction of hydrophilic substituents.

2. A method of minimizing erosion of a soil surface which comprises coating the soil surface with an aqueous slurry of a mixture of bentonite and from 5 to 20 percent (based on said clay) of a water-soluble alkali-metal salt of a carboxy-alkyl cellulose.

3. A method of minimizing erosion of a soil surface which comprises coating the soil surface with a mixture of an expanding lattice clay and from 5 to 20 percent (based on said clay) of cellulose made water-soluble by the chemical introduction of hydrophilic substituents and a fibrous material.

4. The method defined by claim 2 wherein the water-soluble alkali-metal salt of a carboxyalkyl cellulose is sodium carboxymethylcellulose.

5. The method defined by claim 2 wherein the water-soluble alkali-metal salt of a carboxyalkyl cellulose is sodium carboxymethyl hydroxyethyl cellulose.

6. The method defined by claim 3 wherein the fibrous material is paper pulp.

7. The method defined by claim 3 wherein the fibrous material is asbestos.

8. An erosion minimizing composition comprising a mixture of an expanding lattice clay and cellulose made water-soluble by the chemical introduction of hydrophilic substituents.

9. An erosion minimizing composition comprising a mixture of bentonite and a water-soluble alkali-metal salt of a carboxyalkyl cellulose.

10. An erosion minimizing composition comprising a mixture of an expanding lattice clay, from 5 to 20 percent (based on said clay) of cellulose made water-soluble by the chemical introduction of hydrophilic substituents and a fibrous material.

11. The composition of claim 8 wherein the water-soluble cellulose derivative is sodium carboxymethyl hydroxyethyl cellulose.

12. The composition of claim 9 wherein the water-soluble alkali-metal salt of a carboxyalkyl cellulose is sodium carboxymethyl cellulose.

13. The composition of claim 10 wherein the fibrous material is paper pulp.

14. The composition of claim 10 wherein the fibrous material is asbestos.

15. An erosion minimizing composition comprising an aqueous slurry of a mixture of an expanding lattice clay and from 2 to 100 percent (based on said clay) of cellulose made water-soluble by the chemical introduction of hydrophilic substituents.

16. An erosion minimizing composition comprising an aqueous slurry of a mixture of bentonite and from 5 to 20 percent (based on said clay) of a water-soluble alkali-metal salt of a carboxyalkyl cellulose.

17. An erosion minimizing composition comprising an aqueous slurry of a mixture of an expanding lattice clay and from 5 to 20 percent (based on said clay) of cellulose made water-soluble by the chemical introduction of hydrophilic substituents and a fibrous material.

18. The composition of claim 16 wherein the water-soluble alkali-metal salt of a carboxyalkyl cellulose is sodium carboxymethyl cellulose.

19. The composition of claim 15 wherein the water-soluble cellulose derivative is sodium carboxymethyl hydroxyethyl cellulose.

References Cited in the file of this patent

UNITED STATES PATENTS

| | | |
|---|---|---|
| 1,608,917 | Widdis | Nov. 30, 1926 |
| 1,882,377 | Whittelsey | Oct. 11, 1932 |
| 1,962,806 | Clapp | June 12, 1934 |
| 2,498,480 | Bierlich | Feb. 21, 1950 |
| 2,570,537 | Finch | Oct. 9, 1951 |
| 2,625,529 | Hedrick | Jan. 13, 1953 |
| 2,648,165 | Nestor | Aug. 11, 1953 |

OTHER REFERENCES

Dutt: "The effect of water-soluble . . .," Soil Sci. Am. Proc. for 1947 (published 1948), vol. 12, pages 497–501.

Geoghegan: "Aggregate formation in soil," published 1950, in Transactions of 4th International Cong. Soil Sci., vol. 1, pages 198–201.